(12) United States Patent
McCalmont et al.

(10) Patent No.: US 12,545,140 B2
(45) Date of Patent: Feb. 10, 2026

(54) SYSTEMS AND METHODS FOR CHARGING MULTIPLE ELECTRIC VEHICLES

(71) Applicant: Paired Power, Inc., Campbell, CA (US)

(72) Inventors: Aaron William McCalmont, Santa Clara, CA (US); David Thompson McCalmont, Palo Alto, CA (US); Maxym Makhota, Campbell, CA (US)

(73) Assignee: Paired Power, Inc., Campbell, CA (US)

( * ) Notice: Subject to any disclaimer, the term of this patent is extended or adjusted under 35 U.S.C. 154(b) by 23 days.

(21) Appl. No.: 18/761,185

(22) Filed: Jul. 1, 2024

(65) Prior Publication Data

US 2026/0001440 A1    Jan. 1, 2026

(51) Int. Cl.
| | |
|---|---|
| *B60L 53/67* | (2019.01) |
| *B60L 53/10* | (2019.01) |
| *B60L 53/65* | (2019.01) |
| *B60L 55/00* | (2019.01) |
| *H02J 4/00* | (2006.01) |
| *B60L 53/63* | (2019.01) |

(52) U.S. Cl.
CPC ............ *B60L 53/67* (2019.02); *B60L 53/11* (2019.02); *B60L 53/65* (2019.02); *B60L 55/00* (2019.02); *H02J 4/00* (2013.01); *B60L 53/63* (2019.02)

(58) Field of Classification Search
CPC .......... B60L 53/67; B60L 53/11; B60L 53/65; B60L 55/00; B60L 53/63; H02J 4/00
See application file for complete search history.

(56) References Cited

U.S. PATENT DOCUMENTS

| | | | |
|---|---|---|---|
| 8,731,730 B2 | 5/2014 | Watkins et al. | |
| 8,829,851 B2 | 9/2014 | Prosser et al. | |
| 10,828,770 B2 | 11/2020 | Zhao et al. | |
| 12,351,059 B1* | 7/2025 | Li ........................... | B60L 53/63 |
| 2011/0077809 A1 | 3/2011 | Leary | |
| 2012/0013300 A1 | 1/2012 | Prosser et al. | |
| 2015/0165917 A1* | 6/2015 | Robers ..................... | B60L 3/12 |
| | | | 320/109 |
| 2015/0255984 A1* | 9/2015 | Higashi ................... | B60L 53/62 |
| | | | 700/297 |
| 2022/0089055 A1 | 3/2022 | TenHouten et al. | |
| 2023/0067233 A1 | 3/2023 | Noh et al. | |

FOREIGN PATENT DOCUMENTS

WO      2022031689 A9    2/2022

OTHER PUBLICATIONS powerchargeev.com, "Pro Series PowerCharge Overview", Mar. 6, 2024, 4 pages.

* cited by examiner

*Primary Examiner* — Rodney A Butler

(57) ABSTRACT

Example systems and methods for charging multiple electric vehicles are described. In one implementation, a charger receives DC (direct current) power from at least one DC power source. A splitter is coupled to the charger and receives DC power from the charger. The splitter is capable of providing DC power to multiple electric vehicles. The splitter includes a switching matrix to deliver DC power from the charger to a first electric vehicle. The splitter also includes a control system that instructs the switching matrix to stop charging the first electric vehicle and begin charging a second electric vehicle based on at least one factor.

20 Claims, 16 Drawing Sheets

SYSTEMS AND METHODS FOR CHARGING MULTIPLE ELECTRIC VEHICLES

TECHNICAL FIELD

The present disclosure relates to systems and methods capable of charging one or more electric vehicles.

BACKGROUND

The growing use of electric vehicles requires an increased number of charging stations capable of recharging batteries contained in electric vehicles. In many existing systems, electric vehicle charging stations are provided to charge the batteries of one or more electric vehicles. These existing systems may receive power from the power grid, renewable energy sources, and the like.

Many vehicle charging stations provide a separate charger (e.g., a DC (direct current) charger or an AC (alternating current) charger) for charging each electric vehicle. Since DC chargers are typically expensive, providing a separate DC charger for charging each electric vehicle may not be cost effective.

Additionally, if a particular charging station can support only a particular number of electric vehicles at the same time, an additional electric vehicle may arrive at a charging station and not have any available ports (e.g., cords) to connect the electric vehicle. In this situation, the driver of the recently arriving electric vehicle may need to wait for one of the currently connected electric vehicles to finish charging before that driver's electric vehicle can be charged.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
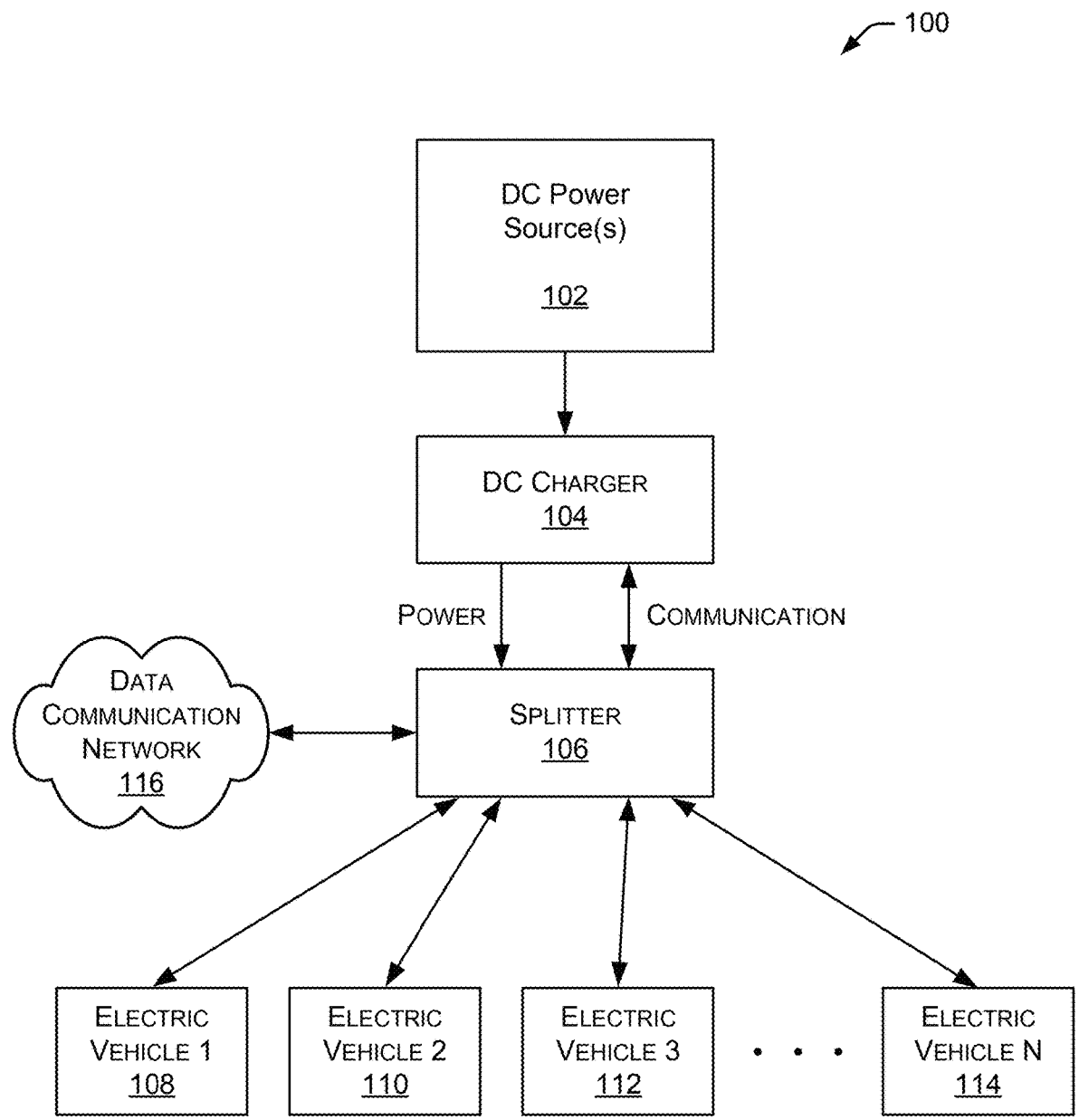
FIG. 1 is a block diagram depicting an embodiment of an electric vehicle charging system.

The systems and methods for charging multiple electric vehicles described herein allow a single charger (e.g., a DC charger or an AC charger) to charge multiple electric vehicles. These systems and methods provide multiple ports (e.g., cords) to connect multiple electric vehicles simultaneously. The multiple electric vehicles may be charged individually by the single charger based on the electric vehicle charge state, charging priority, and other factors discussed herein.

Additionally, the described systems and methods for charging multiple electric vehicles allow a particular electric vehicle to be charged using DC power or AC power through the same port. Thus, the systems and methods discussed herein may begin charging an electric vehicle using AC power, then switch to charging the same electric vehicle using DC power. This may be advantageous because AC power is typically a slower charging process than DC power. If an electric vehicle's charging priority changes and it needs to be charged faster, the described systems and methods may switch that electric vehicle's charging mode from AC power to DC power.

In the following description, reference is made to the accompanying drawings that form a part thereof, and in which are shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, system, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a solid-state drive, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flow diagram and/or block diagram block or blocks.

The systems and methods described herein support the charging of one or more electric vehicles or other devices. Charging locations, as discussed herein, can be located anywhere, but are particularly useful in areas where drivers park their electric vehicles for a period of time, such as a corporate campus, shopping center, retail store, school, convention center, sports arena, apartment building, park, beach, residential location, and the like. As adoption of electric vehicles grows and becomes more prevalent, the demand for charging locations that provide a charge over an extended period of time, such as workplace charging, will increase. In these types of locations, drivers of electric vehicles can enjoy the convenience of charging their vehicle while working, shopping, attending school, or performing other activities.

FIG. 1 is a block diagram depicting an embodiment of an electric vehicle charging system 100. As shown in FIG. 1, one or more DC power sources 102 provide power to a DC charger 104, which is coupled to a splitter 106. DC power source 102 may be powered by either DC power or AC power. For example, in some embodiments, DC charger 104 may convert three-phase AC power to DC power. DC charger 104 provides DC power to splitter 106 and DC charger 104 communicates with splitter 106. In some embodiments, one or more communication protocols are used to communicate information between DC charger 104 and splitter 106. The protocol may vary based on the type of charger, type of vehicle, whether it's AC or DC, the country of operation, and the like. In some implementations, there are two communications occurring in the example of FIG. 1. One communication is between DC charger 104 and the electric vehicle that initiates the charging session and establishes a safe pathway between DC charger 104 and the electric vehicle. The second communication is between splitter 106 and an external data network that sends instructions to splitter 106 regarding what actions to take. The instructions sent to splitter 106 may include, for example, which electric vehicle to charge and the like.

Splitter 106 shares power from DC charger 104 with electric vehicles 108, 110, 112, and 114. Although four electric vehicles 108-114 are shown in FIG. 1, splitter 106 may share power from DC charger 104 with any number of electric vehicles. Splitter 106 may also communicate with other systems and devices via a data communication network 116. In some embodiments, data communication network 116 may include any type of network, such as a local area network, a wide area network, the Internet, a cellular communication network, a Bluetooth, low energy or NFC wireless connection or any combination of two or more data communication networks.

Electric vehicle charging system 100 allows the single DC charger 104 to be shared with any number of electric vehicles. Since DC chargers are often expensive, this configuration allows for a more efficient use of DC charger 104. Additionally, multiple electric vehicles can connect to splitter 106 simultaneously. Thus, instead of a newly arriving electric vehicle having to wait for an available port, the arriving electric vehicle can connect to an available port on splitter 106. Once the arriving electric vehicle is connected to splitter 106, the driver can leave the electric vehicle, which will be charged automatically based on the electric vehicle's charging priority, other electric vehicle charging priorities, and other factors. Since DC charger 104 can charge multiple connected electric vehicles, DC charger 104 may experience higher utilization as compared to a DC charger that is connected to a single electric vehicle at a particular time.

Figure 2:
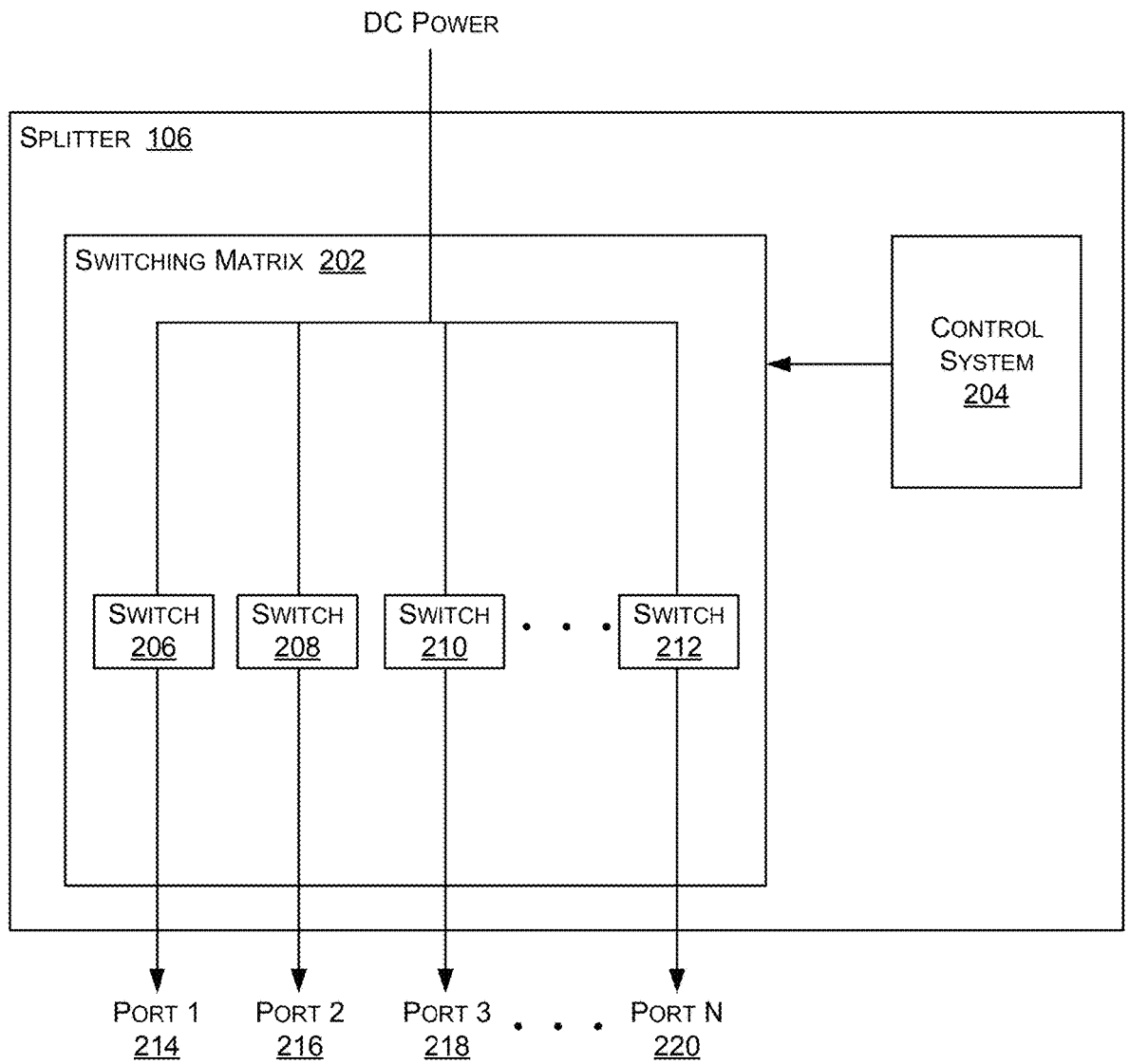
FIG. 2 is a block diagram depicting an embodiment of a splitter.

FIG. 2 is a block diagram depicting an embodiment of splitter 106. Splitter 106 includes a switching matrix 202 and a control system 204. In some embodiments, switching matrix 202 is coupled to receive DC power from a DC charger, such as DC charger 104 discussed with respect to FIG. 1. Switching matrix 202 includes multiple switches 206, 208, 210, and 212. Although four switches 206-212 are shown in FIG. 2, a particular switching matrix 202 may include any number of switches. Each switch 206-212 is associated with a corresponding port 214, 206, 208, and 220. These ports 214-220 may be charging cords or other mechanisms for an electric vehicle to connect with splitter 106. Thus, the number of electric vehicles that can be charged by splitter 106 is based on the number of ports provided for electric vehicle connections.

Control system 204 directs the DC power provided to switching matrix 202 to one of the ports 214-220 based on the electric vehicle currently being charged or next up in the queue to be charged. Control system 204 directs DC power to a particular electric vehicle by activating one of the switches 206-212 that is associated with the electric vehicle to be charged. For example, if the electric vehicle connected to port 216 is to receive DC power, control system 204 may activate switch 208 to provide the DC power to that electric vehicle. In this example, the other switches 206, 210, and 212 are deactivated. At a future time, control system 204 may determine that a different electric vehicle should be charged. In that situation, control system 204 may deactivate switch 208 and activate the switch associated with the different electric vehicle to be charged.

Switches 206-212 may be any type of switch capable of switching DC power to a particular electric vehicle through one of ports 214-220. For example, switches 206-212 may be simple switches, transistors, FETs (Field-Effect Transistors), and the like. In some implementations, switches 206-212 physically switch the power flow (e.g., the DC or AC current that is delivered to each electric vehicle). Switches 206-212 may also switch the protocol and/or data communication wires, which may vary with different communication protocols. For example, with a DC charger, switches 206-212 will switch the CANBUS (controller area network bus) wires for Chademo and the PLC (power line communication) wires for CCS (combined charging system). With an AC charger, switches 206-212 will switch the Control Pilot, which is a signaling wire. Additionally, during a switching operation, splitter 106 may need to preserve the ground fault circuit protection of the charger to assure there is no risk to the drivers and that the UL (underwriters laboratories) listing is preserved. In some embodiments, control system 204 may communicate with other devices and systems via data communication network 116 discussed above with respect to FIG. 1.

Figure 3:
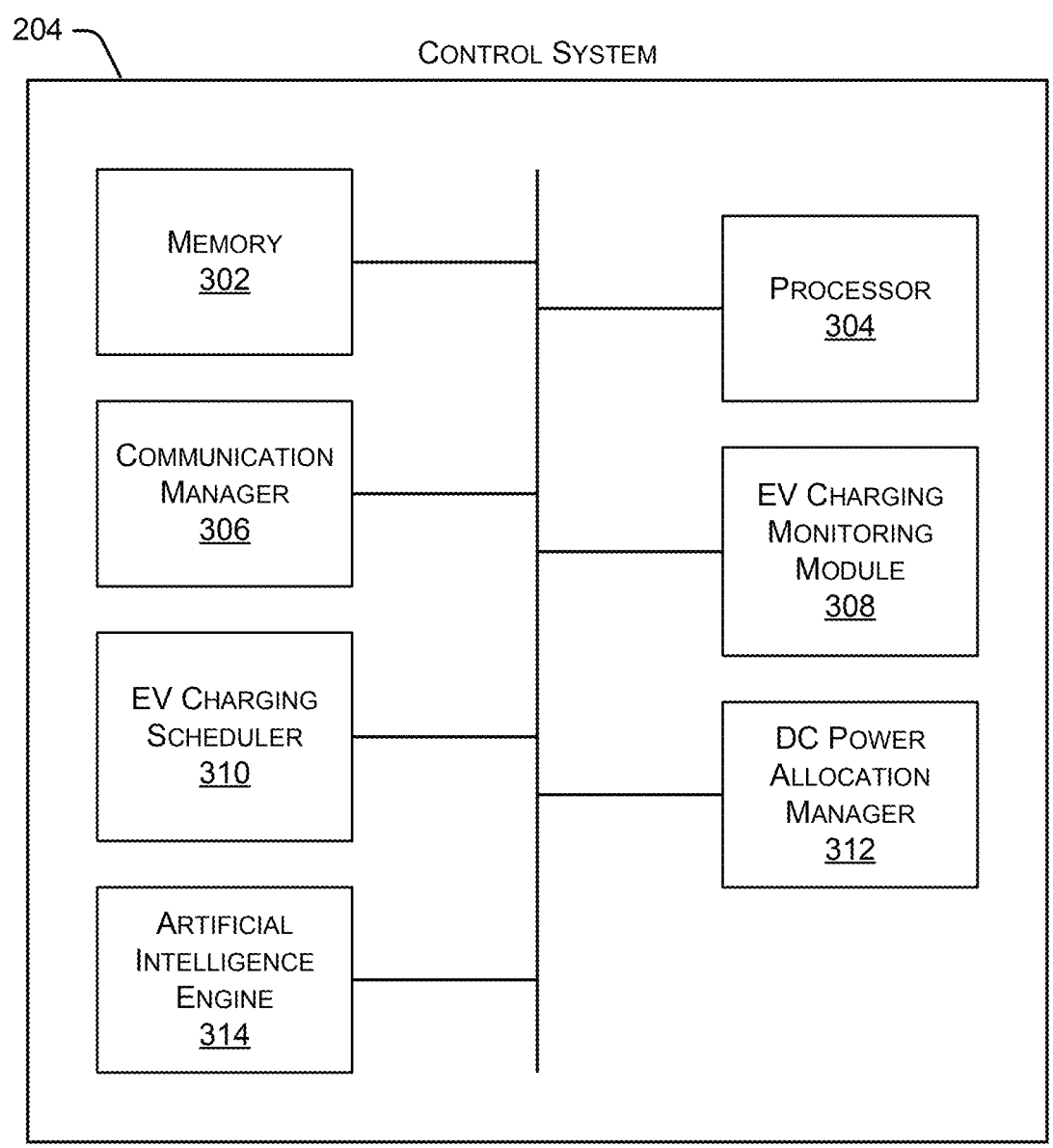
FIG. 3 is a block diagram depicting an embodiment of a control system.

FIG. 3 is a block diagram depicting an embodiment of control system 204. In this example, control system 204 includes a memory 302 and a processor 304. Processor 304 performs various functions necessary to perform the methods and operations discussed herein with respect to charging electric vehicles. Memory 302 stores various data used by processor 304 as well as other components and modules in control system 204.

Control system 204 further includes a communication manager 306 that allows control system 204 to communicate with other systems or devices via any communication medium and using any communication protocol. An EV (electric vehicle) charging monitoring module 308 is capable of monitoring the charging of one or more electric vehicles being charged by electric vehicle charging system 100. For example, EV charging monitoring module 308 may monitor an electric vehicle type and an active charging status of the electric vehicle's battery.

Control system 204 also includes an EV charging scheduler 310 that may schedule the charging of multiple electric vehicles connected to ports of splitter 106. For example, EV charging scheduler 310 may schedule charging of multiple electric vehicles based on each electric vehicle's charging priority, based on a round-robin charging approach (providing a certain amount of time to each connected electric vehicle), and the like.

A DC power allocation manager 312 handles the distribution of DC power to one or more electric vehicles based on the charging schedule associated with the one or more electric vehicles. An artificial intelligence engine 314 may assist with the management and scheduling of electric vehicle charging, as discussed herein.

Figure 4:
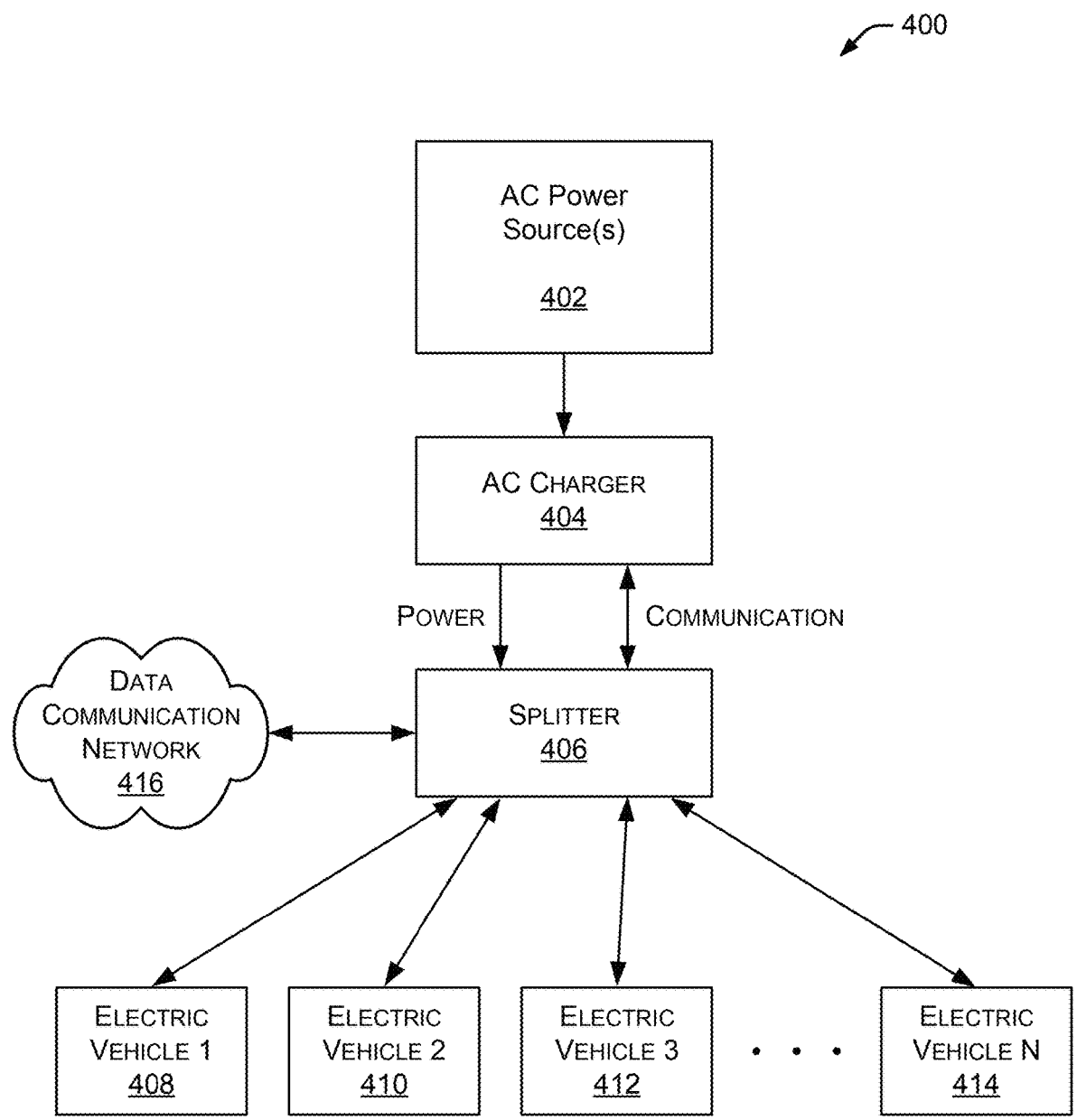
FIG. 4 is a block diagram depicting another embodiment of an electric vehicle charging system.

FIG. 4 is a block diagram depicting another embodiment of an electric vehicle charging system 400. The electric vehicle charging system 400 is similar to electric vehicle charging system 100 discussed above, but receives AC power instead of DC power.

As shown in FIG. 4, one or more AC power sources 402 provide power to an AC charger 404, which is coupled to a splitter 406. In some embodiments, AC charger 404 may provide AC power to splitter 406 and AC charger 404 communicates with splitter 406.

In some embodiments, splitter 406 shares power from AC charger 404 with electric vehicles 408, 410, 412, and 414. Although four electric vehicles 408-414 are shown in FIG. 4, splitter 406 may share power from AC charger 404 with any number of electric vehicles. Splitter 406 may also communicate with other systems and devices via a data communication network 416. In some embodiments, data communication network 416 may include any type of network, such as a local area network, a wide area network, the Internet, a cellular communication network, a Bluetooth, low energy or NFC wireless connection or any combination of two or more data communication networks.

Electric vehicle charging system 400 allows the single AC charger 404 to be shared with any number of electric vehicles. As discussed herein, multiple electric vehicles can connect to splitter 406 simultaneously. Thus, instead of a newly arriving electric vehicle having to wait for an available port, the arriving electric vehicle can connect to an available port on splitter 406. Once the arriving electric vehicle is connected to splitter 406, the driver can leave the electric vehicle, which will be charged automatically based on the electric vehicle's charging priority, other electric vehicle charging priorities, and other factors. Since AC charger 404 can charge multiple connected electric vehicles, AC charger 404 may experience higher utilization as compared to an AC charger that is connected to a single electric vehicle at a particular time.

Figure 5:
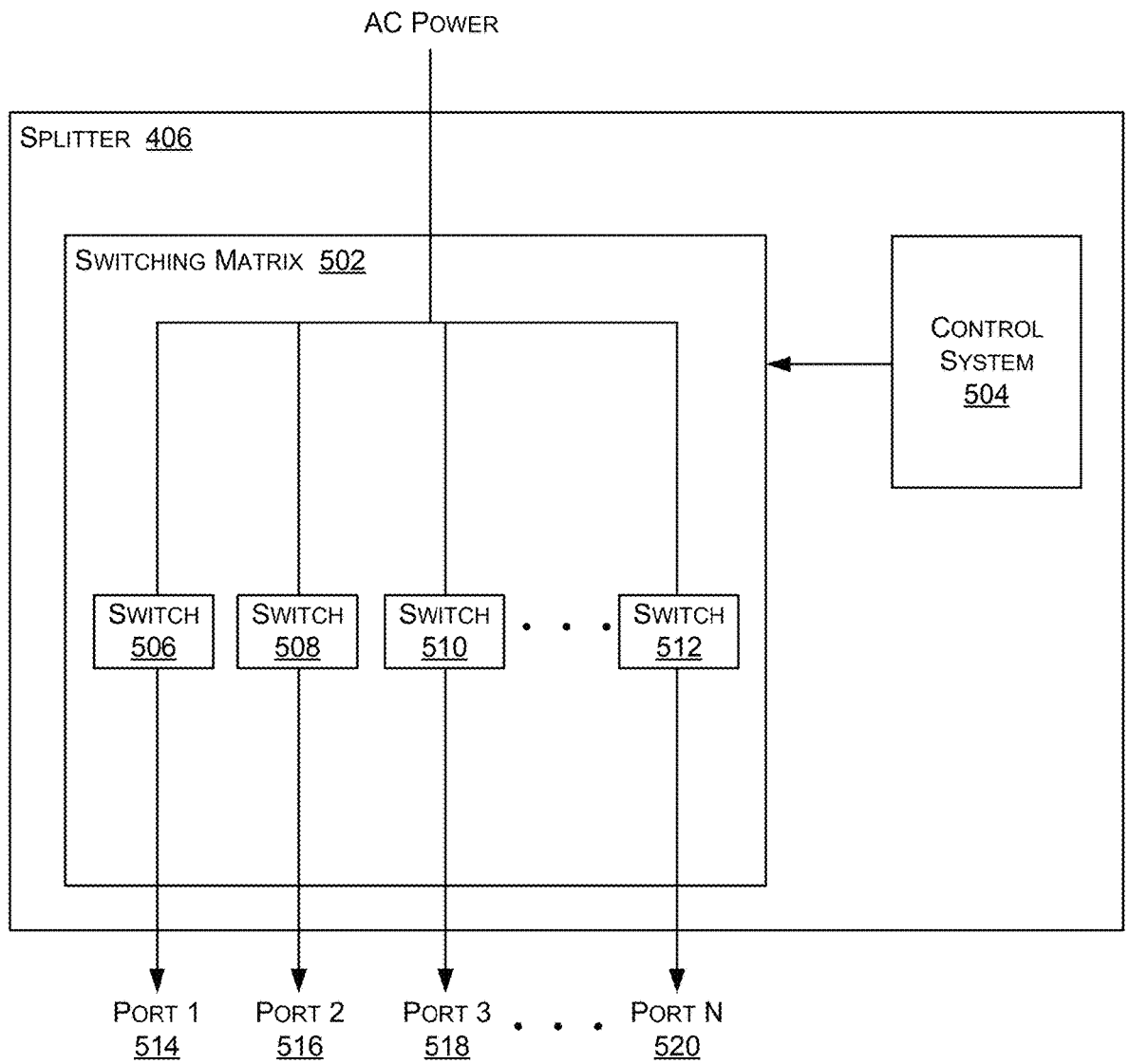
FIG. 5 is a block diagram depicting another embodiment of a splitter.

FIG. 5 is a block diagram depicting another embodiment of splitter 406. Splitter 406 includes a switching matrix 502 and a control system 504. In some embodiments, switching matrix 502 is coupled to receive AC power from an AC charger, such as AC charger 404 discussed with respect to FIG. 4. Switching matrix 502 includes multiple switches 506, 508, 510, and 512. Although four switches 506-512 are shown in FIG. 5, a particular switching matrix 502 may include any number of switches. Each switch 506-512 is associated with a corresponding port 514, 506, 508, and 520. These ports 514-520 may be charging cords or other mechanisms for an electric vehicle to connect with splitter 406. Thus, the number of electric vehicles that can be charged by splitter 406 is based on the number of ports provided for electric vehicle connections.

Control system 504 directs AC power provided to switching matrix 502 to one of the ports 514-520 based on the electric vehicle currently being charged or next up in the queue to be charged. Control system 504 directs AC power to a particular electric vehicle by activating one of the switches 506-512 that is associated with that electric vehicle to be charged. For example, if the electric vehicle connected to port 516 is to receive AC power, control system 504 may activate switch 508 to provide AC power to the electric vehicle. In this example, the other switches 506, 510, and 512 are deactivated. At a future time, control system 504 may determine that a different electric vehicle should be charged. In that situation, control system 504 may deactivate switch 508 and activate the switch associated with the different electric vehicle to be charged.

Switches 506-512 may be any type of switch capable of switching AC power to a particular electric vehicle through one of ports 514-520. For example, switches 506-512 may be simple switches, transistors, FETs (Field-Effect Transistors), and the like. As discussed above with respect to FIG. 2, switches 506-512 may switch both power to the electric vehicles and the communications protocol (e.g., data) signals associated with the particular type of charger. In some embodiments, control system 504 may communicate with other devices and systems via data communication network 116 discussed above with respect to FIG. 1.

Figure 6:
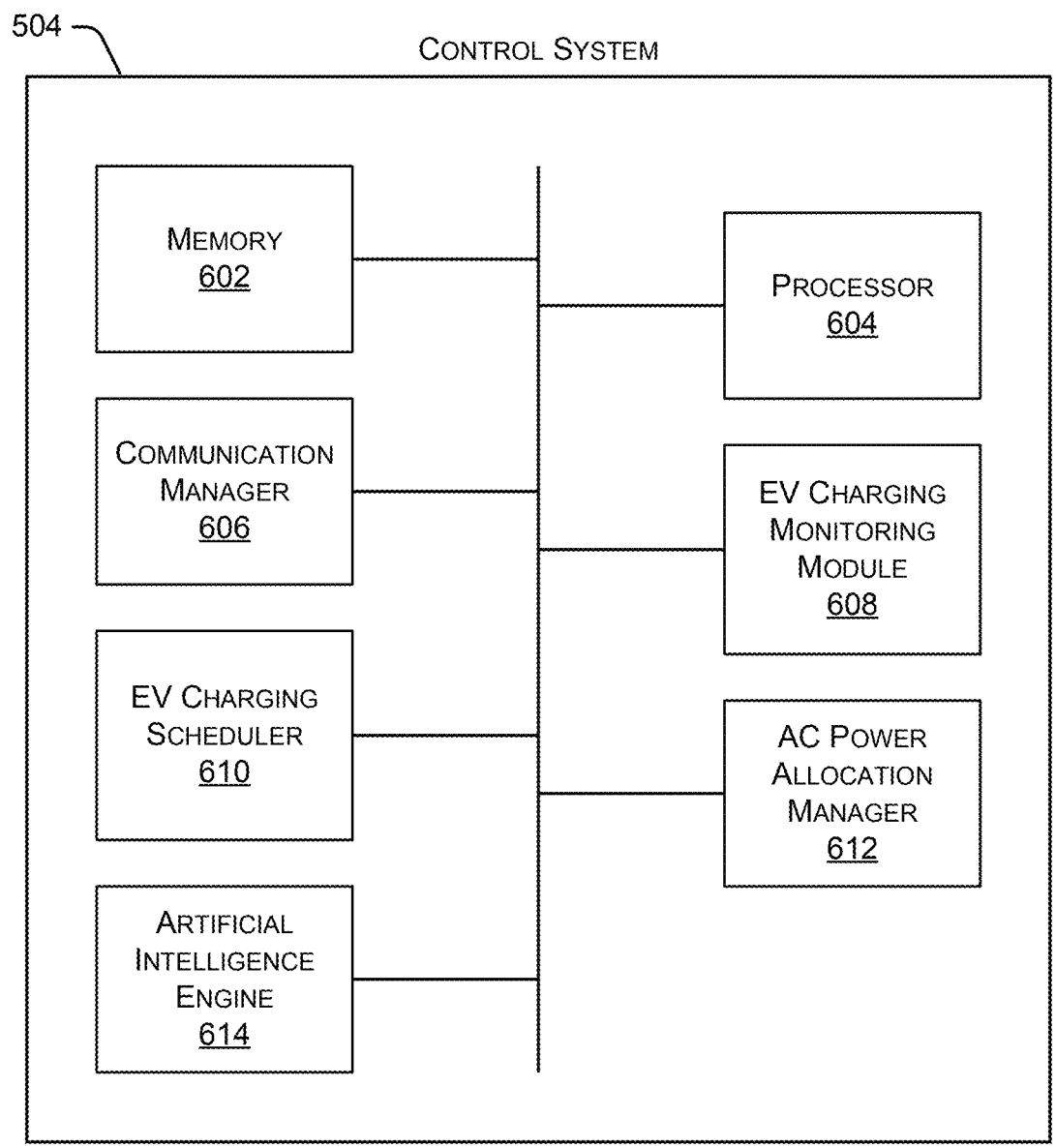
FIG. 6 is a block diagram depicting another embodiment of a control system.

FIG. 6 is a block diagram depicting another embodiment of control system 504. In this example, control system 504 includes a memory 602 and a processor 604. Processor 604 performs various functions necessary to perform the methods and operations discussed herein with respect to charging electric vehicles. Memory 602 stores various data used by processor 604 as well as other components and modules in control system 504.

Control system 504 further includes a communication manager 606 that allows control system 504 to communicate with other systems or devices via any communication medium and using any communication protocol. An EV (electric vehicle) charging monitoring module 608 is capable of monitoring the charging of one or more electric vehicles being charged by electric vehicle charging system 400. For example, EV charging monitoring module 608 may monitor an electric vehicle type and an active charging status of the electric vehicle's battery.

Control system 504 also includes an EV charging scheduler 610 that may schedule the charging of multiple electric vehicles connected to ports of splitter 406. For example, EV charging scheduler 610 may schedule charging of multiple electric vehicles based on each electric vehicle's charging priority, based on a round-robin charging approach (providing a certain amount of time to each connected electric vehicle), and the like.

An AC power allocation manager 612 handles the distribution of AC power to one or more electric vehicles based on the charging schedule associated with the one or more electric vehicles. An artificial intelligence engine 614 may assist with the management and scheduling of electric vehicle charging, as discussed herein.

Figure 7:
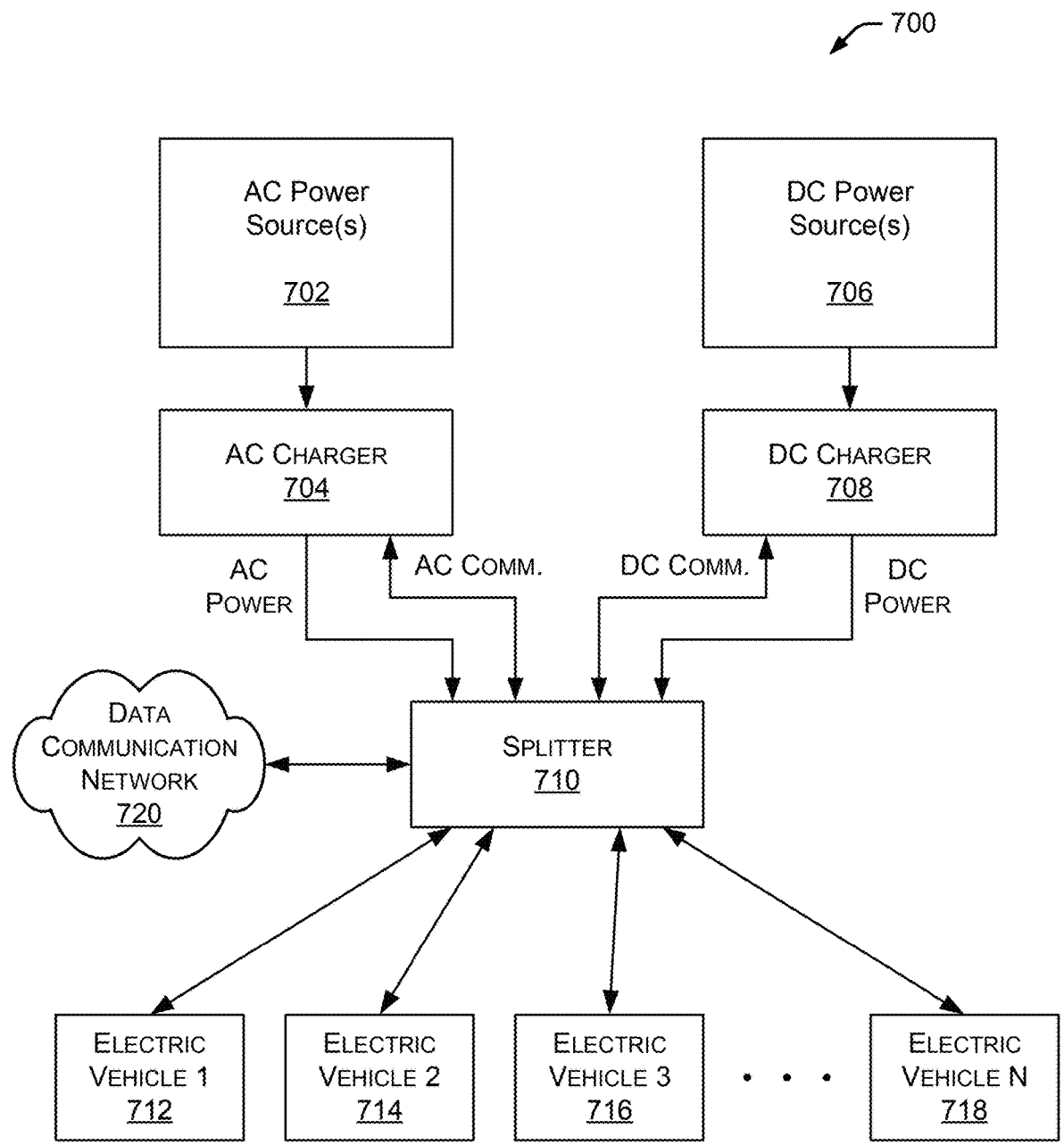
FIG. 7 is a block diagram depicting an embodiment of another electric vehicle charging system.

FIG. 7 is a block diagram depicting an embodiment of another electric vehicle charging system 700. As shown in FIG. 7, one or more AC power sources 702 provide AC power to an AC charger 704. Additionally, one or more DC power sources 706 provide DC power to a DC charger 708. In some embodiments, DC charger 708 may convert three-phase AC power to DC power.

AC charger 704 provides AC power to a splitter 710 and AC charger 704 communicates with splitter 710. Similarly, DC charger 708 provides DC power to splitter 710 and DC charger 708 communicates with splitter 710.

Splitter 710 shares power from AC charger 704 and/or DC charger 708 with electric vehicles 712, 714, 716, and 718. Although four electric vehicles 712-718 are shown in FIG. 7, splitter 710 may share power from AC charger 704 and/or DC charger 708 with any number of electric vehicles. Splitter 710 may also communicate with other systems and devices via data communication network 720. In some embodiments, data communication network 720 may include any type of network, such as a local area network, a wide area network, the Internet, a cellular communication network, a Bluetooth, low energy or NFC wireless connection or any combination of two or more data communication networks.

Electric vehicle charging system 700 allows each electric vehicle 712-718 to be charged using AC power (from one or more AC power sources 702) and/or DC power (from one or more DC power sources 706). Additionally, electric vehicle charging system 700 allows multiple electric vehicles 712-718 to share AC charger 704 and DC charger 708. Although one AC charger 704 and one DC charger 708 are shown in FIG. 7, alternate embodiments may include any number of AC chargers 704 and any number of DC chargers 708 to be shared by any number of electric vehicles.

Electric vehicle charging system 700 allows any of electric vehicles 712-718 to be charged using AC power or DC power. Additionally, the charging of a particular electric vehicle may change from charging with AC power to charging with DC power (and vice versa). In typical situations, AC power may charge an electric vehicle slower than DC power. But AC chargers are typically less expensive than DC chargers. Thus, electric vehicle charging system 700 may include a mix of AC chargers 704 and DC chargers 708 based on the anticipated electric vehicle charging needs.

In a particular example, electric vehicle 712 may connect to electric vehicle charging system 700 and request slow charging during an eight-hour workday. Based on this request, electric vehicle charging system 700 may begin charging electric vehicle 712 using AC power from AC charger 704. Later in the day, the owner of electric vehicle 712 may have a schedule change that requires the owner to leave work earlier than expected. In this situation, electric vehicle charging system 700 may switch electric vehicle 712 to be charged using DC power from DC charger 708. Since electric vehicle 712 is already connected to splitter 710, the splitter can stop charging electric vehicle 712 with AC power and begin charging electric vehicle 712 using DC power, which will charge electric vehicle 712 faster than using AC power. This faster charging using DC power may allow electric vehicle 712 to receive a full charge (or substantially full charge) in a shorter period of time.

As mentioned above, electric vehicle charging system 700 may include multiple AC chargers 704 and/or multiple DC chargers 708. The number of AC chargers 704 and the number of DC chargers 708 in a particular electric vehicle charging system 700 may vary based on the number of electric vehicles anticipated to be charged and the charging needs (e.g., amount of charge, frequency of charging, and required speed of charging) of the electric vehicles using electric vehicle charging system 700. In a particular example, electric vehicle charging system 700 may include multiple AC chargers 704 which are less expensive and one or two DC chargers 708 which are more expensive. Splitter 710 can then adjust the power source (AC power or DC power) for each electric vehicle as well as the charging schedule for multiple connected electric vehicles to best utilize the available AC power and DC power to meet the charging demands of the multiple connected electric vehicles.

As discussed herein, once an arriving electric vehicle is connected to splitter 710, the driver can leave the electric vehicle, which will be charged automatically based on the electric vehicle's charging priority, other electric vehicle charging priorities, and other factors. Since the connection cable between the electric vehicle and splitter 710 supports both AC charging and DC charging, splitter 710 can switch between charging the electric vehicle using AC power and DC power without requiring a different cable or disconnecting any cables.

Figure 8:
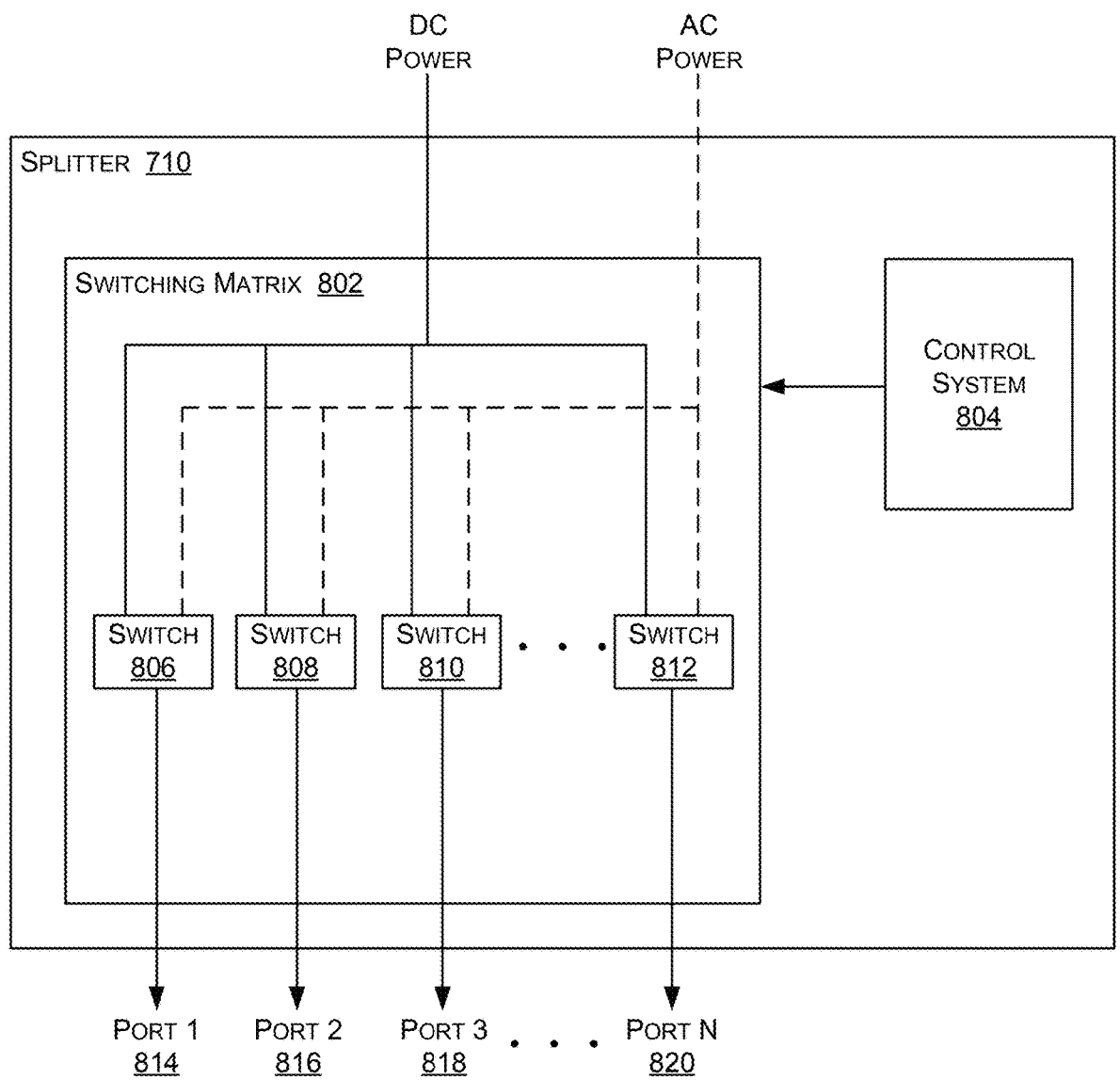
FIG. 8 is a block diagram depicting another embodiment of a splitter.

FIG. 8 is a block diagram depicting another embodiment of splitter 710. Splitter 710 includes a switching matrix 802 and a control system 804. In some embodiments, switching matrix 802 is coupled to receive DC power from a DC charger, such as DC charger 708 discussed with respect to FIG. 7. Additionally, switching matrix 802 is coupled to receive AC power from an AC charger, such as AC charger 704 discussed with respect to FIG. 7.

Switching matrix 802 includes multiple switches 806, 808, 810, and 812. Although four switches 806-812 are shown in FIG. 8, a particular switching matrix 802 may include any number of switches. Each switch 806-812 is associated with a corresponding port 814, 816, 818, and 820. These ports 814-820 may be cords or other mechanisms for an electric vehicle to connect with splitter 710. Thus, the number of electric vehicles that can be charged by splitter 710 is based on the number of ports provided for electric vehicle connections.

Control system 804 directs DC power and/or AC power provided to switching matrix 802 to one of the ports 814-820 based on the electric vehicle currently being charged. Control system 804 directs DC power or AC power to a particular electric vehicle by activating one of the switches 806-812 that is associated with the electric vehicle to be charged. Additionally, the activated switch is instructed whether to provide DC power or AC power to the port. For example, if the electric vehicle connected to port 816 is to receive DC power, control system 804 may activate switch 808 to provide the DC power to the electric vehicle. In this example, the other switches 806, 810, and 812 are deactivated. At a future time, control system 804 may determine that the electric vehicle connected to port 816 should be charged using AC power. In that situation, control system 804 may instruct switch 808 to stop providing DC power to the electric vehicle and begin providing AC power to the same electric vehicle.

Switches 806-812 may be any type of switch capable of switching DC power to a particular electric vehicle through one of ports 814-820. For example, switches 806-812 may be simple switches, transistors, FETs (Field-Effect Transistors), and the like. In some embodiments, control system 804 may communicate with other devices and systems via data communication network 116 discussed above with respect to FIG. 1.

Figure 9:
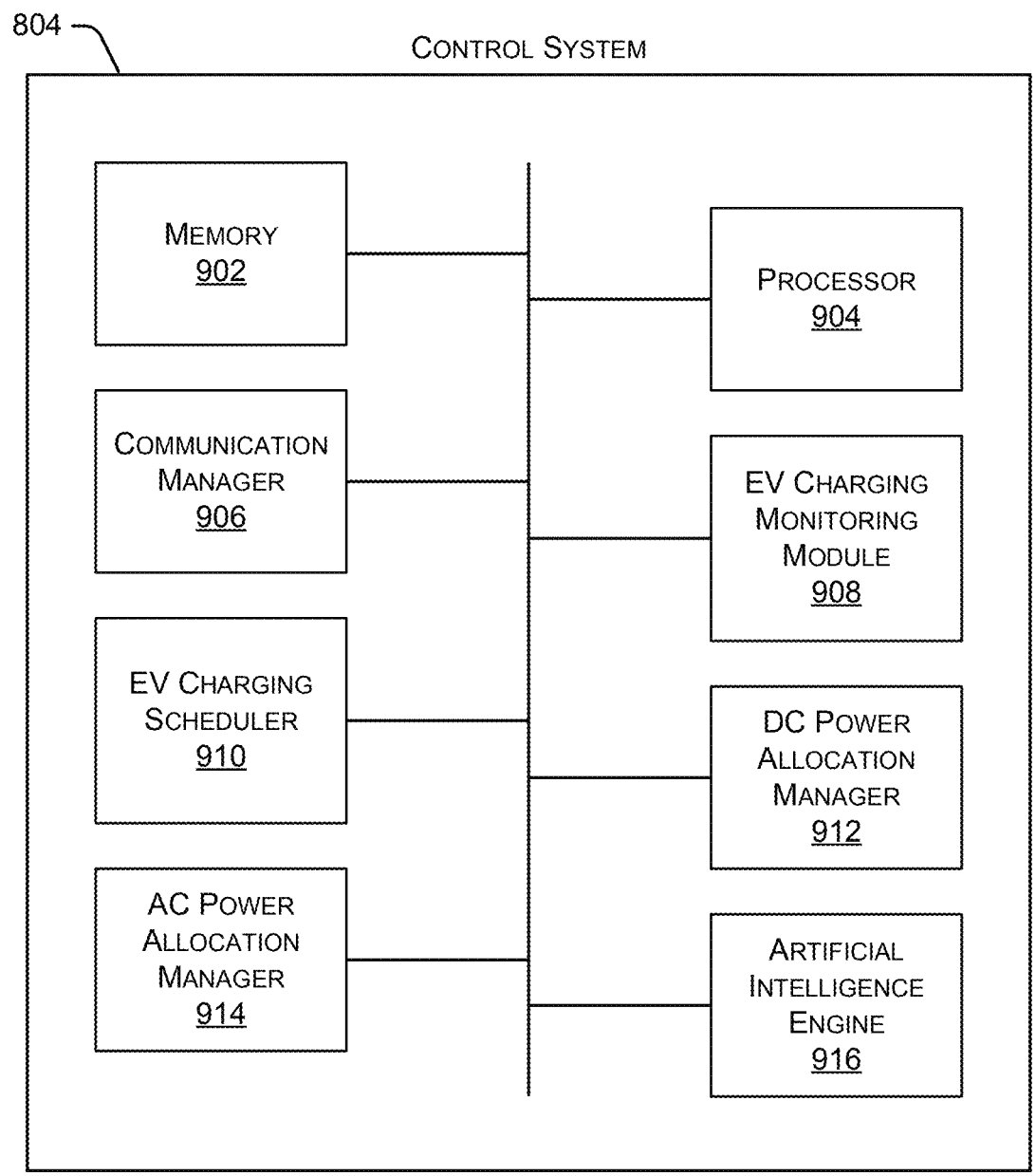
FIG. 9 is a block diagram depicting another embodiment of a control system.

FIG. 9 is a block diagram depicting another embodiment of control system 804. In this example, control system 804 includes a memory 902 and a processor 904. Processor 904 performs various functions necessary to perform the methods and operations discussed herein with respect to charging electric vehicles. Memory 902 stores various data used by processor 904 as well as other components and modules in control system 804.

Control system 804 further includes a communication manager 906 that allows control system 804 to communicate with other systems or devices via any communication medium and using any communication protocol. An EV (electric vehicle) charging monitoring module 908 is capable of monitoring the charging of one or more electric vehicles being charged by electric vehicle charging system 700. For example, EV charging monitoring module 908 may monitor an electric vehicle type and an active charging status of the electric vehicle's battery.

Control system 804 also includes an EV charging scheduler 910 that may schedule the charging of multiple electric vehicles connected to ports of splitter 710. For example, EV charging scheduler 910 may schedule charging of multiple electric vehicles based on each electric vehicle's charging priority, based on a round-robin charging approach (providing a certain amount of time to each connected electric vehicle), and the like. Additionally, EV charging scheduler 910 may schedule and/or change the type of power (e.g., AC power or DC power) used to charge a particular electric vehicle.

A DC power allocation manager 912 handles the distribution of DC power to one or more electric vehicles based on the charging schedule associated with the one or more electric vehicles. Similarly, an AC power allocation manager 914 handles the distribution of AC power to one or more electric vehicles based on the charging schedule associated with the one or more electric vehicles. An artificial intelligence engine 916 may assist with the management and scheduling of electric vehicle charging, as discussed herein.

Figure 10:
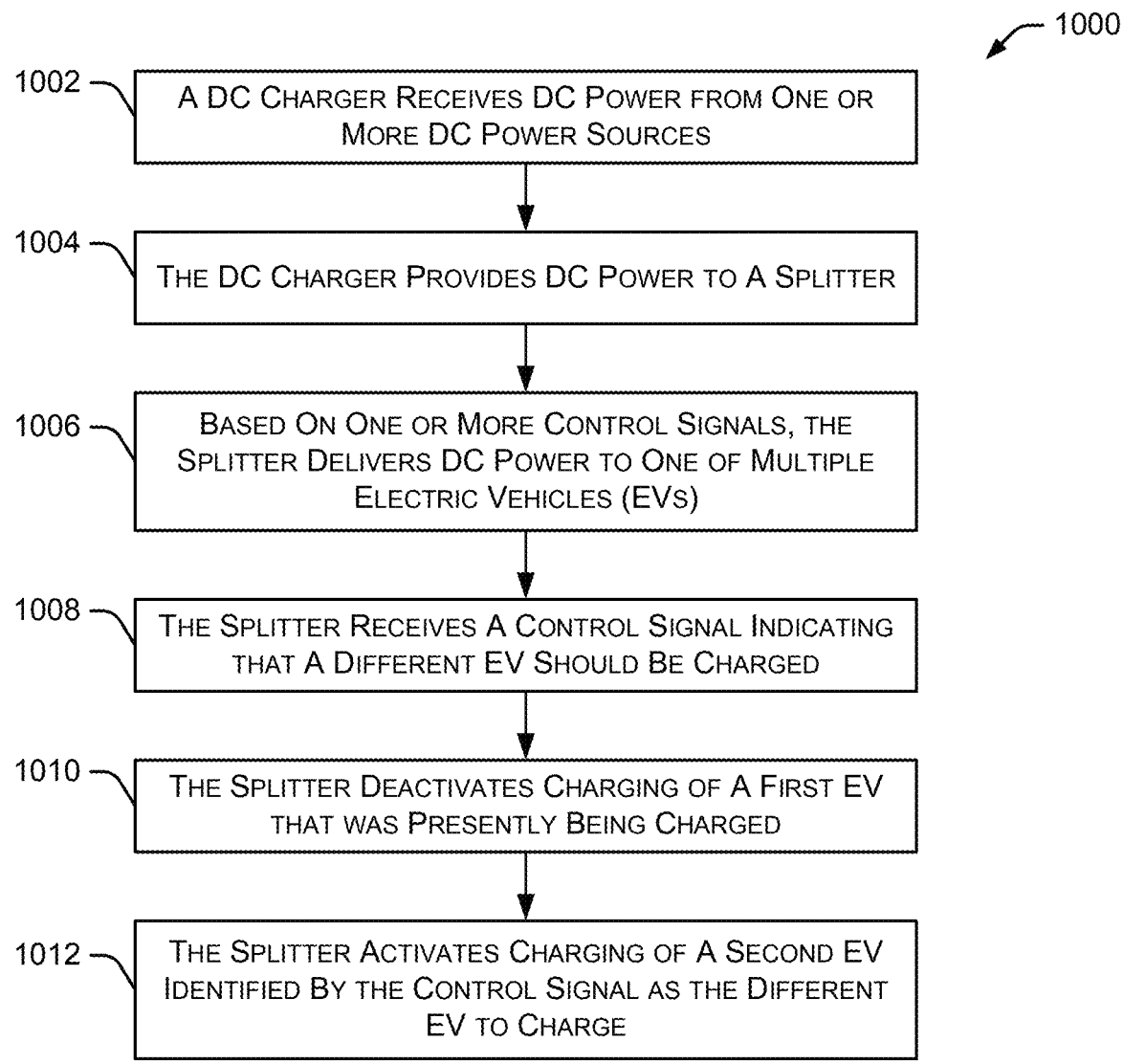
FIG. 10 illustrates an example method for charging multiple electric vehicles.

FIG. 10 illustrates an example method 1000 for charging multiple electric vehicles. Initially, a DC charger receives 1002 DC power from one or more DC power sources. The DC charger then provides 1004 DC power to a splitter. Based on one or more control signals, the splitter delivers 1006 DC power to one of the multiple electric vehicles. The splitter receives 1008 (e.g., at a later time) a control signal indicating that a different electric vehicle should be charged. In response to the control signal, the splitter deactivates 1010 charging of a first electric vehicle that was presently being charged. The splitter then activates 1012 charging of a second electric vehicle identified by the control signal as the different electric vehicle to charge.

Figure 11:
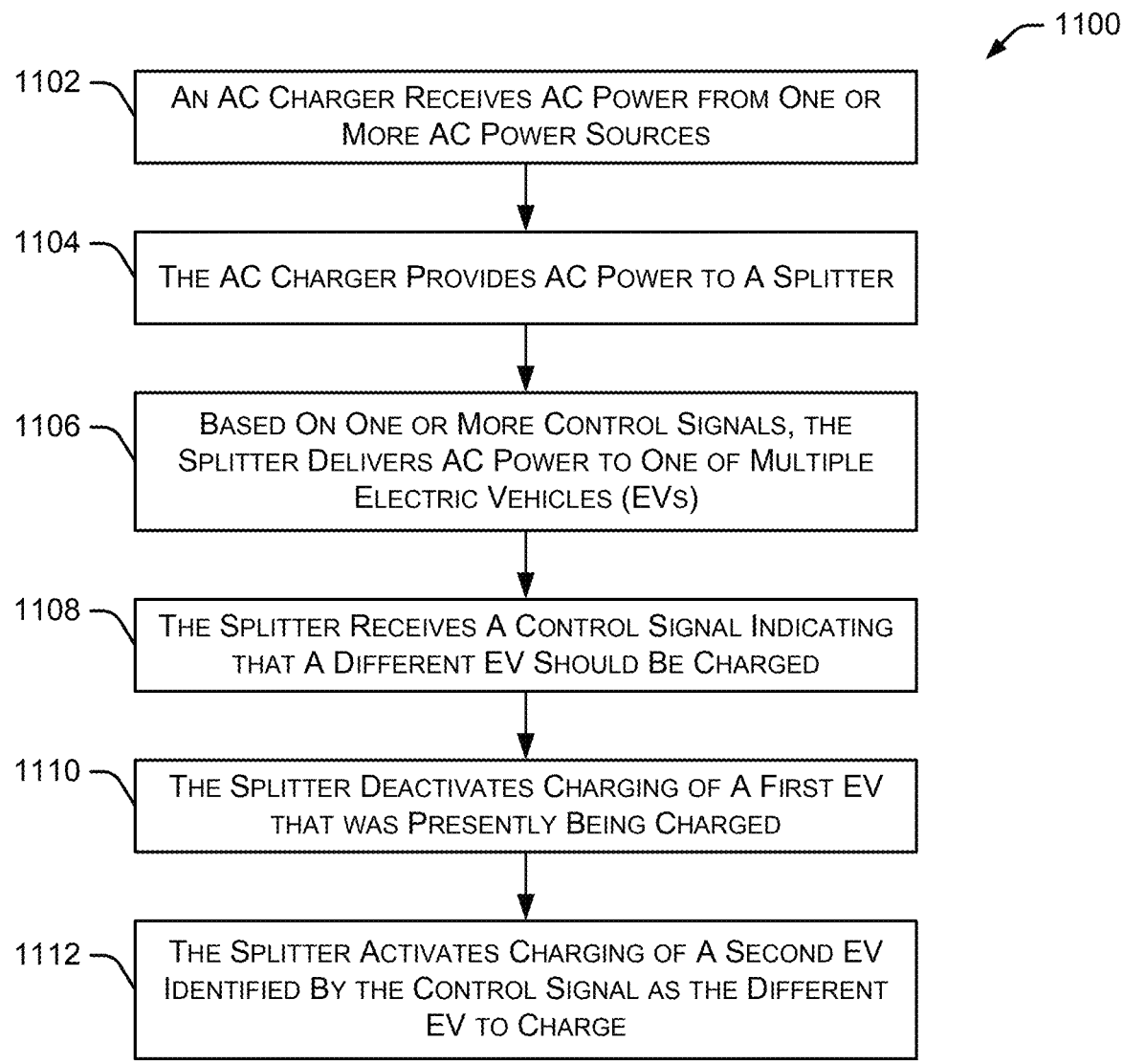
FIG. 11 illustrates another example method for charging multiple electric vehicles.

FIG. 11 illustrates another example method 1100 for charging multiple electric vehicles. Initially, an AC charger receives 1102 AC power from one or more AC power sources. The AC charger then provides 1104 AC power to a splitter. Based on one or more control signals, the splitter delivers 1106 AC power to one of the multiple electric vehicles. The splitter receives 1108 (e.g., at a later time) a control signal indicating that a different electric vehicle should be charged. In response to the control signal, the splitter deactivates 1110 charging of a first electric vehicle that was presently being charged. The splitter then activates 1112 charging of a second electric vehicle identified by the control signal as the different electric vehicle to charge.

Figure 12:
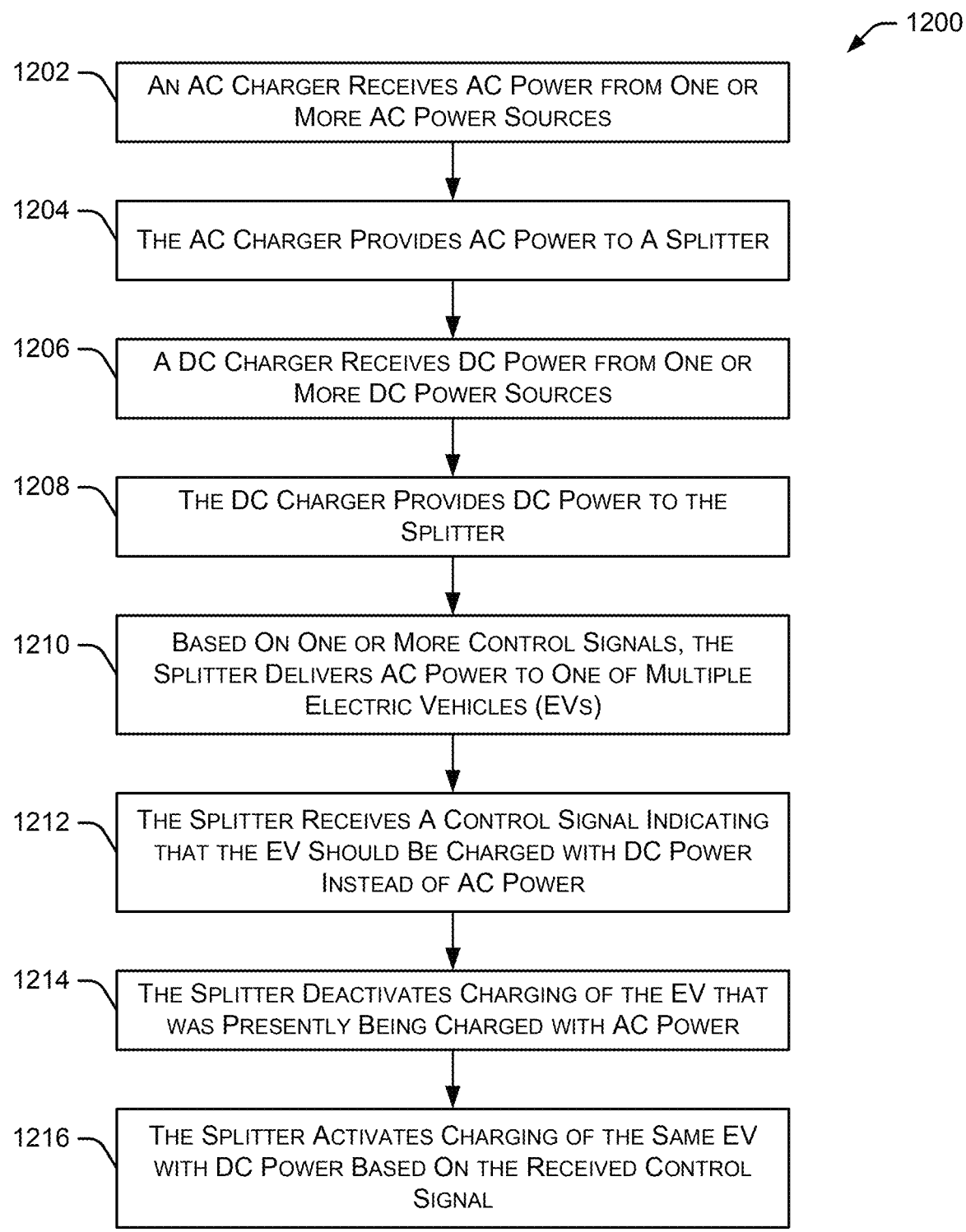
FIG. 12 illustrates another example method for charging multiple electric vehicles.

FIG. 12 illustrates another example method 1200 for charging multiple electric vehicles. Initially, an AC charger receives 1202 AC power from one or more AC power sources. The AC charger provides 1204 the received AC power to a splitter. Additionally, a DC charger receives 1206 DC power from one or more DC power sources. The DC charger provides 1208 the received DC power to the splitter. Based on one or more control signals, the splitter delivers 1210 AC power to one of multiple electric vehicles to charge the electric vehicle. The splitter receives 1212 another control signal (e.g., at a future time) indicating that the electric vehicle should be charged with DC power instead of AC power. In response to the control signal, the splitter deactivates 1214 charging of the electric vehicle that was presently being charged with AC power. The splitter then activates 1216 charging of the same electric vehicle with DC power based on the received control signal. In other situations, a control signal may indicate that an electric vehicle being charged with DC power should be switched to charging with AC power. Thus, the example method 1200 is useful in switching the charging of an electric vehicle from charging with AC power to DC power and vice versa (e.g., switching the charging of the electric vehicle from charging with DC power to AC power).

Figure 13:
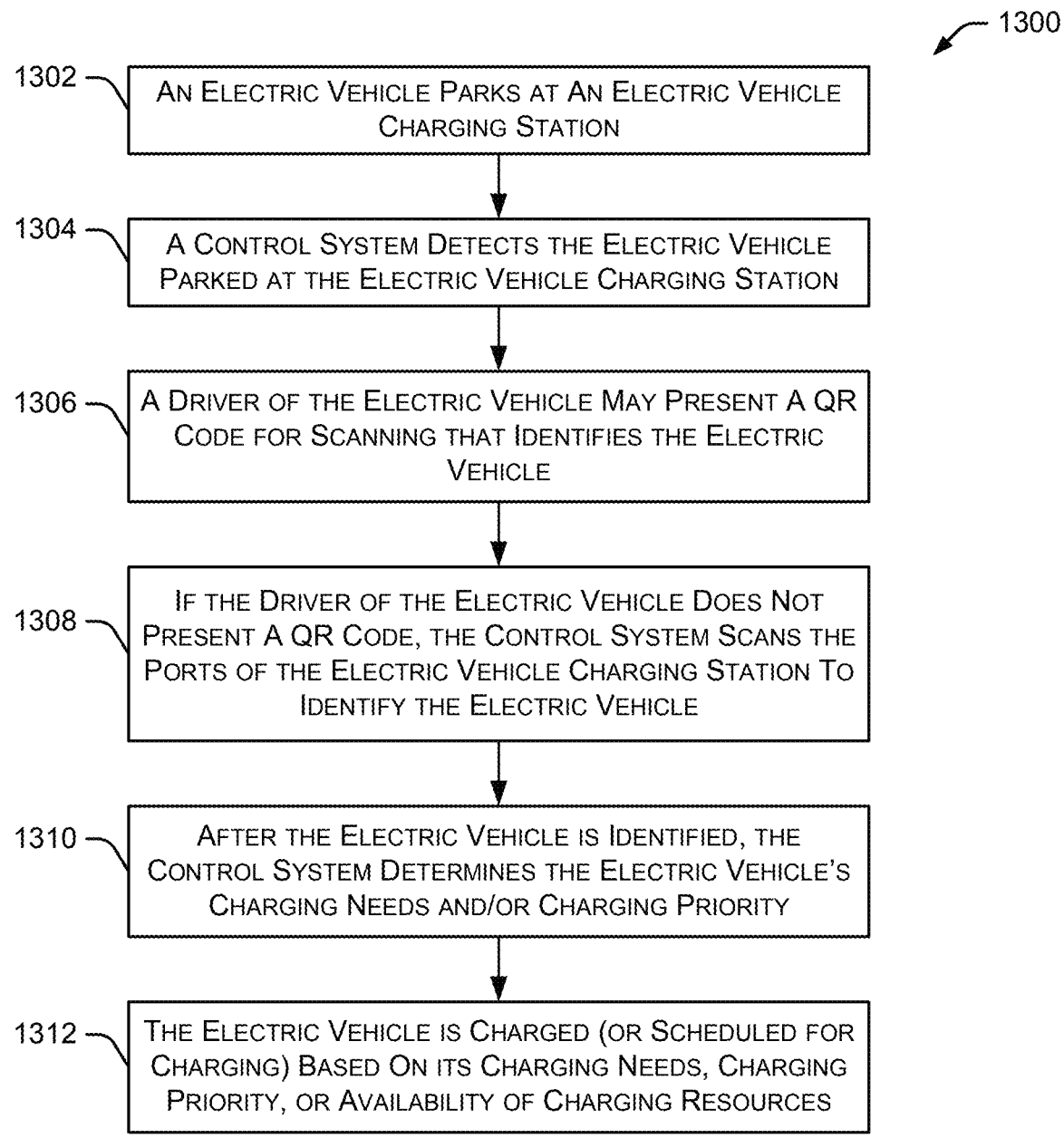
FIG. 13 illustrates an example method for detecting and identifying electric vehicles that need charging.

FIG. 13 illustrates an example method 1300 for detecting and identifying electric vehicles that need charging. Initially, an electric vehicle parks 1302 at an electric vehicle charging station. A control system detects 1304 the electric vehicle parked at the electric vehicle charging station. A driver of the electric vehicle may present 1306 a QR (Quick-Response) code for scanning that identifies the electric vehicle or makes a request to the charging system for that vehicle to be charged. Alternatively, the driver of the electric vehicle may present any other type of code or identifier associated with the driver or the electric vehicle. If the driver of the electric vehicle does not present a QR code, the control system scans 1308 the ports of the electric vehicle charging station to identify the electric vehicle or to determine that an electric vehicle is present and plugged into the charging station. In other embodiments, any type of scanning protocol or scanning mechanism may be used to identify a vehicle, a vehicle type, vehicle charging requirements, a vehicle owner, and the like. After the electric vehicle is identified, the control system determines 1310 the electric vehicle's charging needs and/or charging priority. The electric vehicle is then charged (or scheduled for charging) 1312 based on its charging needs, charging priority, or availability of charging resources.

Figure 14:
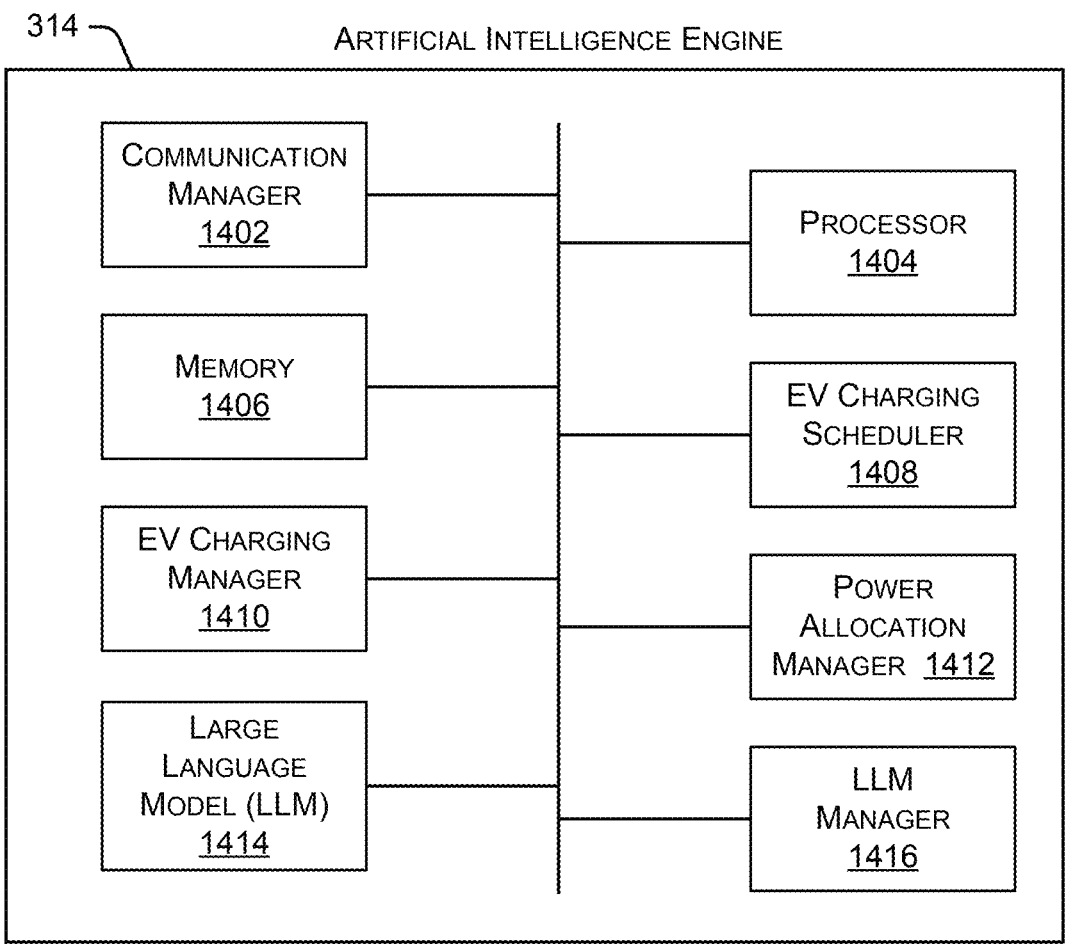
FIG. 14 is a block diagram depicting an embodiment of an artificial intelligence engine.

FIG. 14 is a block diagram depicting an embodiment of an artificial intelligence engine 314. In some embodiments, a similar artificial intelligence engine is used for artificial intelligence engine 614 shown in FIG. 6 and artificial intelligence engine 916 shown in FIG. 9. Artificial intelligence engine 314 may assist with the management and scheduling of electric vehicle charging and other activities discussed herein.

As shown in FIG. 14, artificial intelligence engine 314 may include a communication manager 1402, a processor 1404, and a memory 1406. Communication manager 1402 allows artificial intelligence engine 314 to communicate with other systems. Processor 1404 executes various instructions to perform the functionality provided by artificial intelligence engine 314, as discussed herein. Memory 1406 stores these instructions as well as other data used by processor 1404 and other modules and components contained in artificial intelligence engine 314.

Additionally, artificial intelligence engine 314 includes an electric vehicle charging scheduler 1408 that can schedule the charging of multiple electric vehicles using DC power and/or AC power. Electric vehicle charging scheduler 1408 can schedule charging times and charging sessions for any number of electric vehicles at an electric vehicle charging station. An electric vehicle charging manager 1410 manages the charging of one or more electric vehicles at an electric vehicle charging station based on scheduled charging times, scheduled charging stations, predicted future vehicle charging needs based on historical data, and the like.

Artificial intelligence engine 314 further includes a power allocation manager 1412 that allocates DC power and allocates AC power for charging one or more electric vehicles at an electric vehicle charging station. In some embodiments, power allocation manager 1412 may allocate DC power and/or AC power to charge one or more electric vehicles based on current power pricing, demand charges, electric vehicle charging needs, and the like.

Artificial intelligence engine 314 also includes an LLM (Large Language Model) manager 1416 that manages one or more LLMs 1414 used by artificial intelligence engine 314. For example, LLM manager 1416 may manage the training of LLMs 1414, updating the LLMs 1414, and the like.

In some embodiments, artificial intelligence engine 314 implements generative AI techniques and/or processes that learn by collecting various data related to a particular set of systems and circumstances. The generative AI techniques and/or processes have the ability to generate their own result, such as a schedule that would be needed to satisfy the data set that it had examined about the history of electric vehicle charging at a particular set of charging stations.

In some embodiments, the systems and methods discussed herein may manage the charging of multiple electric vehicles based on availability of energy from the grid. For example, the systems and methods may consider the demand management of grid power consumed at a particular site based on the charging of multiple electric vehicles and control those electric vehicle chargers by reducing their output or switching them off temporarily to accommodate a demand spike or other demand response request to save money or reduce demand during times of peak demand. In other examples, the described systems and methods may respond to a variety of changing circumstances of energy flows, energy availability, energy cost, and the like.

In some implementations, the systems and methods described herein may manage the flow of energy from an electric vehicle to the grid (V2G). For example, the systems and methods my cause energy stored in one or more electric vehicle batteries to feed the grid, such as during times of high energy usage or high demand charges. This allows one or more electric vehicles to support the grid. By providing energy from electric vehicles to the grid, the described systems provide a comprehensive energy management system that supports electric vehicles and the grid during times of varying energy needs.

Figure 15:
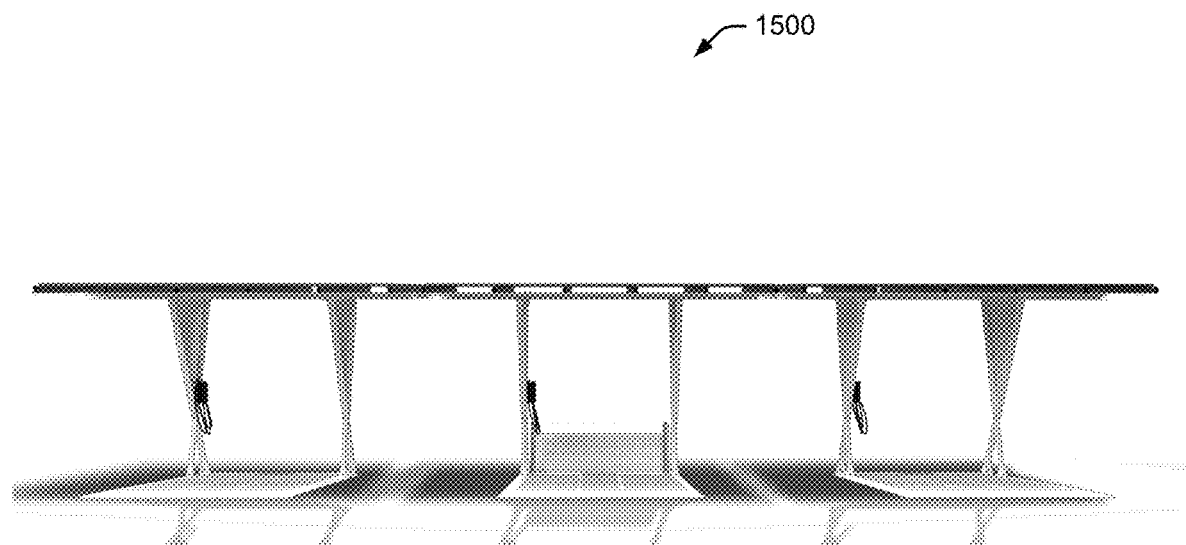
FIG. 15 depicts a front view of an embodiment of an electric vehicle charging station capable of charging multiple electric vehicles simultaneously.

FIG. 15 depicts a front view of an embodiment of an electric vehicle charging station 1500 capable of charging multiple electric vehicles simultaneously. Vehicle charging station 1500 includes five or more parking spaces that are available to support the charging of five or more electric vehicles using DC power and/or AC power at the same time or over a period of time. Other embodiments may include any number of parking spaces for simultaneously charging any number of electric vehicles. In some implementations, electric vehicle charging station 1500 may be configured to charge more electric vehicles than other types of charging stations. For example, a particular location may include 100 charging stations and charging cords, but only 30 or 40 chargers (the electrical infrastructure actually delivering the charge to the vehicle). The switching matrix and splitter discussed herein manage the charging of as many cars as possible using the available power capacity (e.g., grid capacity) and the available chargers.

Figure 16:
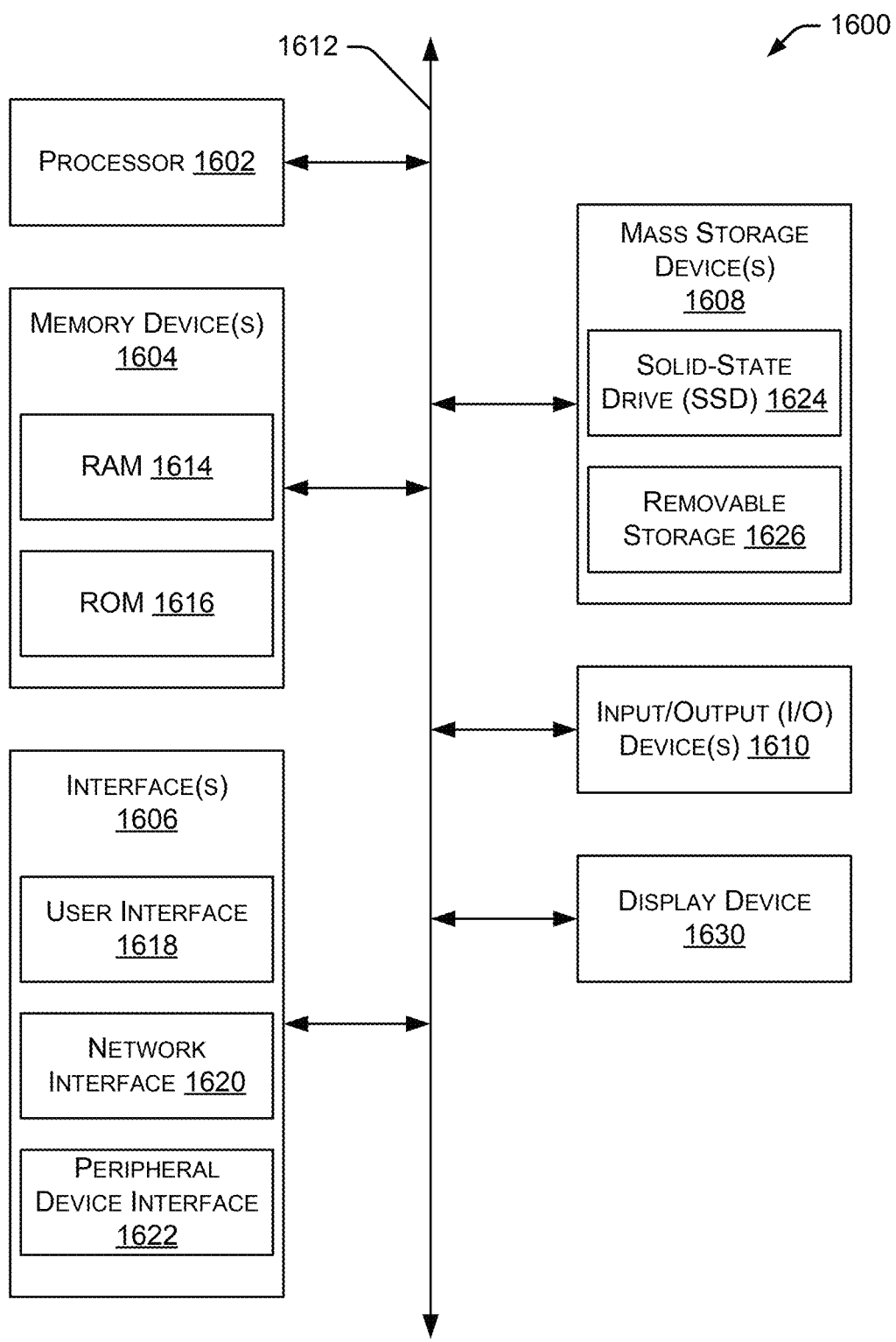
FIG. 16 depicts a block diagram of an embodiment of a computing device.

FIG. 16 depicts a block diagram of an embodiment of a computing device 1600. Computing device 1600 may be used to perform various procedures, such as those discussed herein. Computing device 1600 can execute one or more application programs, such as the application programs or functionality described herein. Computing device 1600 can be any of a wide variety of computing devices, such as an embedded processor, desktop computer, a notebook computer, a server computer, a handheld computer, tablet computer, smartphone, a wearable device, and the like.

Computing device 1600 includes one or more processor(s) 1602, one or more memory device(s) 1604, one or more interface(s) 1606, one or more mass storage device(s) 1608, one or more Input/Output (I/O) device(s) 1610, and a display device 1630 all of which are coupled to a bus 1612. Processor(s) 1602 include one or more processors or controllers that execute instructions stored in memory device(s) 1604 and/or mass storage device(s) 1608. Processor(s) 1602 may also include various types of computer-readable media, such as cache memory.

Memory device(s) 1604 include various computer-readable media, such as volatile memory (e.g., random access memory (RAM) 1614) and/or nonvolatile memory (e.g., read-only memory (ROM) 1616). Memory device(s) 1604 may also include rewritable ROM, such as Flash memory.

Mass storage device(s) 1608 include various computer readable media, such as magnetic tapes, magnetic disks, optical disks, solid-state memory (e.g., Flash memory), solid-state drives (SSDs), and so forth. As shown in FIG. 16, a particular mass storage device is a solid-state drive 1624. Various drives may also be included in mass storage device(s) 1608 to enable reading from and/or writing to the various computer readable media. Mass storage device(s) 1608 include removable media 1626 and/or non-removable media.

I/O device(s) 1610 include various devices that allow data and/or other information to be input to or retrieved from computing device 1600. Example I/O device(s) 1610 include smartphones, RFID readers, cursor control devices, keyboards, keypads, microphones, monitors or other display devices, speakers, printers, network interface cards, modems, and the like.

Display device 1630 includes any type of device capable of displaying information to one or more users of computing device 1600. Examples of display device 1630 include a smartphone, display screen, an external PC, a monitor, display terminal, video projection device, and the like.

Interface(s) 1606 include various interfaces that allow computing device 1600 to interact with other systems, devices, or computing environments. Example interface(s) 1606 may include any number of different network interfaces 1620, such as interfaces to local area networks (LANs), wide area networks (WANs), wireless networks, cellular modem networks, and the Internet. Interface(s) 1606 may further include an external smartphone (or other portable computing device) that uses a browser as an interface to cloud-based computing systems and the like. Other interface(s) include user interface 1618 and peripheral device interface 1622. The interface(s) 1606 may also include one or more user interface elements 1618. The interface(s) 1606 may also include one or more peripheral interfaces such as interfaces for printers, pointing devices (mice, track pad, keypad, or any suitable user interface now known to those of ordinary skill in the field, or later discovered), keyboards, and the like.

Bus 1612 allows processor(s) 1602, memory device(s) 1604, interface(s) 1606, mass storage device(s) 1608, and I/O device(s) 1610 to communicate with one another, as well as other devices or components coupled to bus 1612. Bus 1612 represents one or more of several types of bus structures, such as a system bus, PCI bus, IEEE bus, USB bus, CAN bus, powerline communications (PLC) bus, and so forth.

For purposes of illustration, programs and other executable program components are shown herein as discrete blocks, although it is understood that such programs and components may reside at various times in different storage components of computing device 1600, and are executed by processor(s) 1602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. An apparatus comprising:
   an AC (alternating current) charger configured to receive AC power from at least one AC power source;
   a DC (direct current) charger configured to receive DC power from at least one DC power source; and
   a splitter coupled to the AC charger and the DC charger, the splitter is configured to receive AC power from the AC charger and receive DC power from the DC charger, the splitter is further coupled to provide AC power or DC power to a plurality of electric vehicles, the splitter further comprising:
   a switching matrix configured to deliver AC power from the AC charger or DC power from the DC charger to a first electric vehicle of the plurality of electric vehicles; and
   a control system coupled to the switching matrix and configured to instruct the switching matrix to:
   stop charging the first electric vehicle using AC power and begin charging the first electric vehicle using DC power based on at least one factor; or
   stop charging the first electric vehicle using DC power and begin charging the first electric vehicle using AC power based on the at least one factor.

2. The apparatus of claim 1, wherein the at least one factor includes a change in charging priority of the first electric vehicle.

3. The apparatus of claim 1, wherein the at least one factor includes at least one of a price of energy presently available from the existing power grid connection, a present availability of energy from the existing power grid connection, or a speed at which a particular electric vehicle needs to be charged.

4. The apparatus of claim 1, wherein the at least one factor includes at least one of current energy needs to charge the plurality of electric vehicles, estimated future energy needs to charge the plurality of electric vehicles, estimated future energy prices, or estimated future energy availability.

5. The apparatus of claim 1, wherein the control system is further configured to control charging of the plurality of electric vehicles based on data from an artificial intelligence engine.

6. The apparatus of claim 1, wherein the control system is further configured to select the first electric vehicle to receive power from the charger based on a highest electric vehicle charging priority.

7. The apparatus of claim 1, wherein the control system is further configured to provide energy from at least one electric vehicle's battery to a power grid.

8. A method comprising:
receiving, by an AC (alternating current) charger, AC power from at least one AC power source;
providing the AC power to a splitter;
receiving, by a DC (direct current) charger, DC power from at least one DC power source;
providing the DC power to the splitter;
receiving, by the splitter, a control signal, wherein the control signal instructs the splitter to deliver power to at least one electric vehicle;
delivering, by a switching matrix, AC power from the AC charger or DC power from the DC charger to a first electric vehicle; and
instructing the switching matrix to:
stop charging the first electric vehicle using AC power and begin charging the first electric vehicle using DC power based on at least one factor; or
stop charging the first electric vehicle using DC power and begin charging the first electric vehicle using AC power based on the at least one factor.

9. The method of claim 8, wherein the at least one factor includes a change in charging priority of the first electric vehicle.

10. The method of claim 8, wherein the at least one factor includes at least one of a price of energy presently available from an existing power grid connection, a present availability of energy from the existing power grid connection, or a speed at which a particular electric vehicle needs to be charged.

11. The method of claim 8, wherein the at least one factor includes at least one of current energy needs to charge a plurality of electric vehicles, estimated future energy needs to charge the plurality of electric vehicles, estimated future energy prices, or estimated future energy availability.

12. The method of claim 8, further comprising controlling charging of a plurality of electric vehicles based on data from an artificial intelligence engine.

13. The method of claim 8, further comprising selecting the first electric vehicle to receive power from the charger based on a highest electric vehicle charging priority.

14. The method of claim 8, further comprising providing energy from at least one electric vehicle's battery to a power grid.

15. An apparatus comprising:
an AC (alternating current) charger configured to receive AC power from at least one AC power source;
a DC (direct current) charger configured to receive DC power from at least one DC power source;
a splitter coupled to receive AC power from the AC charger and receive DC power from the DC charger, wherein the splitter is further configured to provide AC power or DC power to a plurality of electric vehicles;
a switching matrix configured to deliver AC power from the AC charger or DC power from the DC charger to a first electric vehicle of the plurality of electric vehicles; and
an artificial intelligence engine configured to control charging of the plurality of electric vehicles, wherein the artificial intelligence instructs the switching matrix to:
stop charging the first electric vehicle using AC power and begin charging the first electric vehicle using DC power based on at least one factor; or
stop charging the first electric vehicle using DC power and begin charging the first electric vehicle using AC power based on the at least one factor.

16. The apparatus of claim 15, wherein the at least one factor includes a change in charging priority of the first electric vehicle.

17. The apparatus of claim 15, wherein the artificial intelligence engine is further configured to control charging of the plurality of electric vehicles by scheduling charging of at least one of the plurality of electric vehicles.

18. The apparatus of claim 15, wherein the artificial intelligence engine is further configured to schedule charging times and charging duration for each of the plurality of electric vehicles.

19. The apparatus of claim 15, wherein the artificial intelligence engine is further configured to change charging the first electric vehicle from AC power to DC power or from DC power to AC power based on predicted future charging needs of the first electric vehicle.

20. The apparatus of claim 19, wherein the predicted future charging needs of the first electric vehicle are based on historical data associated with the first electric vehicle.

* * * * *